FOLDED HYBRID JUNCTION
Filed April 30, 1953
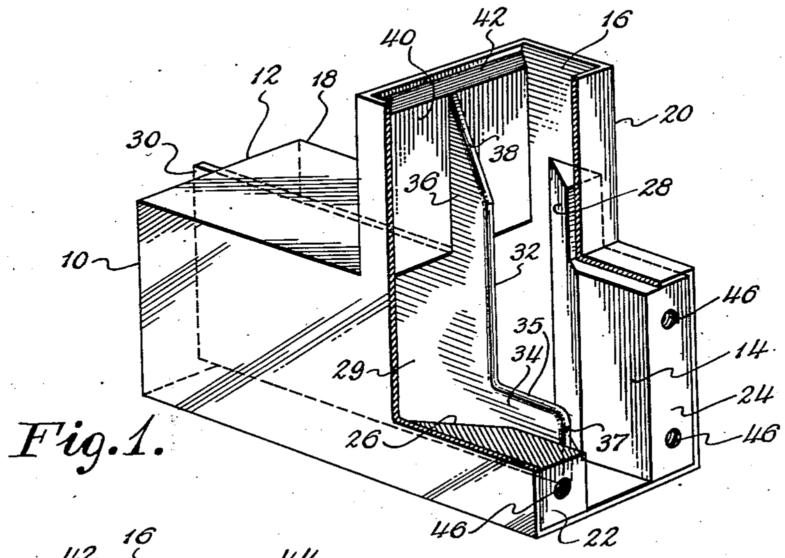
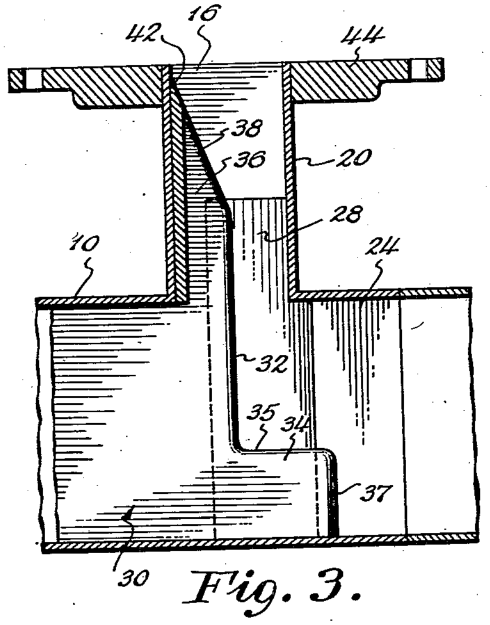
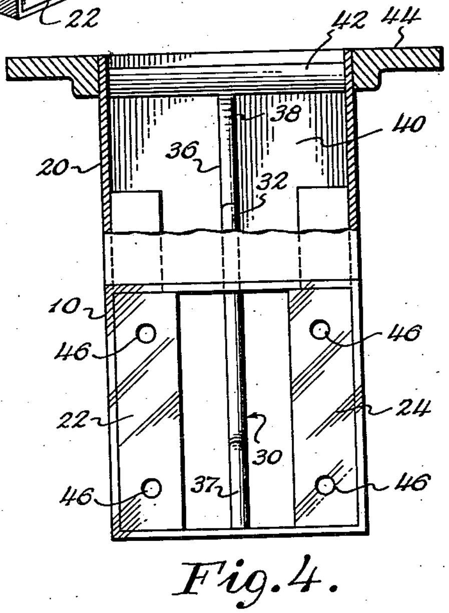
Fig. 4.
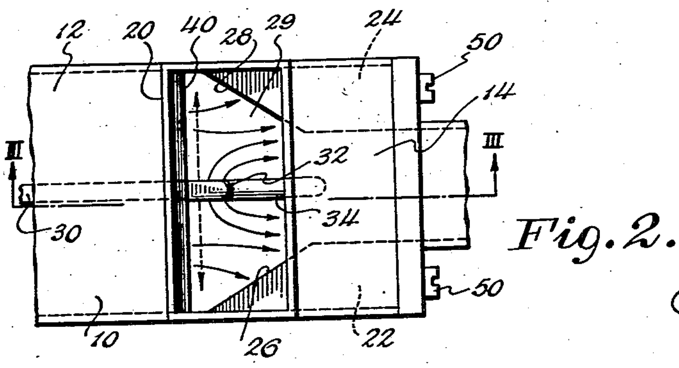
Fig. 2.
INVENTOR
P. GENE SMITH
BY
Thomas M. Ferrill, Jr.
ATTORNEY United States Patent Office 2,792,551

Patented May 14, 1957

2,792,551

FOLDED HYBRID JUNCTION

P. Gene Smith, Wantagh, N. Y., assignor to Sperry Rand Corporation, a corporation of Delaware Application April 30, 1953, Serial No. 352,244

12 Claims. (Cl. 333—11)

This invention relates to microwave transmission apparatus, and more particularly, is concerned with a folded type of hybrid junction.

As is well known to those skilled in the art, the hybrid junction or so-called "magic tee" type of junction includes four wave guide arms which intersect in such manner that two of the arms are collinear extensions of each other, and the other two branch arms are at right angles to each other and to the collinear arms. See Patent No. 2,445,895. This structure has balanced characteristics like those of a hybrid coil and is used for analogous purposes at the relatively high frequencies where wave guides find their principal applications.

As a result of the peculiar configuration of the hybrid junction in which the branch arms are mutually perpendicular with each other and with the collinear arms, the use of the magic tee type junction frequently results in a ponderous and unhandy microwave transmission line layout. While such space-consiuming wave guide circuits may be tolerable in laboratory equipment, for example, use of the magic tee for this reason has proved troublesome in airborne radar systems where compactness is essential. Moreover, in the conventional magic tee type of junction, it is frequently necessary to provide reactive elements such as posts, rods, or irises in the wave guides to improve the impedance match of the junction to the different arms. The result of incorporating such reactance elements generally is to reduce the peak power handling capacity of the junction.

It is the general object of this invention to avoid and overcome the foregoing and other difficulties of and objections to the prior art practices by the provision of an improved wave guide hybrid junction.

Another object of this invention is to provide a hybrid junction in which the collinear arms are folded so as to be parallel to each other and substantially aligned with one of the branch arms whereby a much more compact physical design is achieved.

Another object of this invention is the provision of a hybrid junction for wave guides in which the peak power handling capacity between the collinear arms and at least one of the branch arms is greatly increased while a substantial impedance match therebetween is retained.

These and other objects of the invention which will become apparent as the description proceeds are achieved by providing a hybrid junction in which the usual collinear arms are in effect folded back so as to be positioned in parallel relationship to each other with a common broad wall in the form of a septum separating the two arms. These wave guide arms merge through a tapered section into a first rectangular branch arm. The second branch arm of the hybrid junction is joined at one end to the adjacent narrow walls of the collinear arms in the region of the tapered section, the septum forming the collinear arms extending partially into the second branch arm. To give improved impedance matching characteristics between the branch arms and collinear arms, the septum has a portion substantially rectangular in outline which extends beyond the junction at the tapered section into the first branch arm along the wall opposite the junction with the second branch arm.

For a better understanding of the invention reference should be had to the accompanying drawing wherein:

Fig. 1 is a perspective view that is partially cut away to show internal details of a hybrid junction without the coupling flanges or attached wave guide lines;

Fig. 2 is a plan view of the junction shown in Fig. 1 including a portion of coupled wave guide line;

Fig. 3 is a sectional view taken on the line III—III of Fig. 2 and showing a coupling flange on one of the arms; and Fig. 4 is an end view, partially in section, of the hybrid junction of Fig. 3.

With specific reference to the form of the invention as illustrated in the drawing, the numerals 10 and 12 indicate generally the two arms of the folded hybrid junction which correspond in function to the usual collinear arms of the standard form of magic tee. The numeral 14 indicates generally one of the branch arms of the folded hybrid junction which correspond in function to the series arm of the standard magic tee while the numeral 16 indicates generally the other branch arm of the present hybrid junction which corresponds in function to the shunt arm of the standard magic tee. The arms 10, 12, 14, and 16 will hereinafter be referred to in terms of their equivalent functions in the conventional type of magic tee structure.

In accordance with the preferred embodiment of the invention as illustrated, the numeral 18 indicates generally a section of hollow pipe which is substantially square in cross section. A second hollow pipe forming a rectangular wave guide, indicated at 20, is joined at one end to the top wall of the first pipe 18 to provide a T-junction therebetween. The second pipe 20 is rectangular in cross section and forms the shunt arm 16 of the hybrid junction.

The series arm 14 of the hybrid junction is formed by a pair of blocks of conductive material, indicated at 22 and 24, which are inserted in one end of the first pipe 18 to form a section of rectangular wave guide whose broad dimension extends parallel to the longitudinal axis of the second pipe 20. The blocks 22 and 24 include tapered portions 26 and 28 respectively which form a tapered wave guide transition section 29 between the rectangular section forming the series arm 14 and square section of the pipe 18. It is desirable that the tapered portions 26 and 28 extend up into the second pipe 20 to improve the peak power capacity of the branch arm 14 and collinear arms 10 and 12.

A septum, indicated generally at 30, extends between the top and bottom walls of the square pipe 18 dividing it into two adjacent rectangular wave guides which form the two collinear arms 10 and 12 of the hybrid junction. The septum 30 extends into the region of the junction and terminates over a portion of its extent between the top and bottom walls of the pipe 18 in an edge 32 which is parallel to the longitudinal axis of pipe 20. A portion 34 of the septum 30, which is substantially rectangular in outline form, extends beyond the edge 32 along the bottom wall of the wave guide 18 into the series arm 14. The portion 34 has an edge 35 parallel to the longitudinal axis of the pipe 18 and an edge 37 parallel to the longitudinal axis of the pipe 20. A second portion 36 of the septum 30 extends up into the shunt arm 16 along the edge 32 and terminates in a tapered edge 38. The proportions and functions of these portions of the septum 30 will be hereinafter described in more detail.

The pipe 20 has a reduced narrow dimension in the region of the junction which is effected by means of a conductive plate 40, the plate extending the full width of the broad wall of the rectangular pipe 20. The plate 40 has an edge 42 beveled at the same angle as the tapered edge 38 of the septum portion 36 to form a gradual transition between the wider and narrower sections of the pipe 20 for reducing reflection of energy back along the arm 16.

A flange 44 may be provided for coupling a wave guide transmission line to the shunt arm 16 of the hybrid junction. So that a transmission line, a portion of which is indicated at 48, may be joined to the series arm 14, the blocks 22 and 24 may be tapped, as indicated at 46, to receive securing screws 50.

To function as a magic tee the junction must provide complete isolation between the branch arms 14 and 16, that is, no energy must be coupled directly from one branch arm into the other. Likewise, there must be perfect isolation between the collinear arms 10 and 12. To accomplish this result the branch arms 14 and 16 must be each matched to the collinear arms 10 and 12 with purely reactive impedance elements and at the same time the symmetry of the junction about the plane of the septum 30 must be maintained.

Match between the series arm 14 and the collinear arms 10 and 12 is provided by the tapered portions 26 and 28 of the blocks 22 and 24, which provide a gradual transition between the rectangular section forming the arm 14 and the collinear arms 10 and 12. Since the electric field of the dominant mode in the rectangular section forming the branch arm 14 is perpendicular to the septum 30, the latter causes negligible reflection at the edge 32. Any mismatch caused by the opening into the pipe 20 can be practically eliminated by proper tapering of the blocks 22 and 24 and proper positioning of the blocks along the pipe 18 relative to the junction with the pipe 20. It has been found for best matching that the tapered portions of the block 22 and 24 should extend along the pipe 18 a distance substantially equal to the narrow dimension of the rectangular section between the blocks. The blocks are positioned along the pipe 18 so that the tapered section 29 defined by the blocks extends partially beyond the junction with the pipe 20 in the direction of the series arm 14, as shown in the drawing.

To achieve a match betwen the shunt arm 16 and the collinear arms 10 and 12 has proved more difficult and is achieved in the present invention by inclusion of the portion 34 of septum 30, the outline dimensions of which have a definite effect on the match. Also the width of the portion 36 has a material effect on this match.

Energy propagated in the dominant $TE_{0,1}$ mode in the shunt arm 16 is distorted by the portion 36 of the septum 30, the field configuration at the tapered edge 38 being indicated by the arrows in Fig. 2. The components of the field perpendicular to the face of the septum 30 couple energy in the dominant mode into the arms 10 and 12, as indicated by the dotted arows of Fig. 2. Due to the symmetry of the field produced, the components perpendicular to the septum 30 oppose each other in the branch arm 14, so that no energy is propagated in that arm but is reflected back along the arms 10 and 12. The length of the edge 35 can be proportioned so that the phase of the energy reflected from the branch arm 14 is such that it adds in phase with the energy coupling directly into the collinear arms 10 and 12. This length has been found to be of the order of a quarter wavelength at the operating frequency of the hybrid junction.

Energy in the wave guide 20 having E-field components parallel to the septum is propagated across the pipe 18; the arms of the hybrid junction are below cut-off for the mode which can be set up by these components. The length of the edge 37 of the septum 30 is adjusted so that what energy is reflected by the edge 35 is phased so as to cancel out reflections from other sources of energy back along the pipe 20. The distance between the edge 35 and the end of the pipe 20 for best match has been found to be of the order of a half wavelength at the operating frequency.

It has further been found that energy propagated along the series arm 14 sets up energy in the $TE^{0,2}$ mode in the pipe 20 unless the latter guide is proportioned so as to be well below cut-off for this mode right at the junction. Otherwise, the portion of the pipe 20 between the junction and the apparent plane of reflection for the $TE^{0,2}$ mode acts as a resonant cavity which appears as a high reactance across the arm 14. For this reason the plate 40 is inserted in the pipe 20 as above described. The edge 32 is spaced from the broad wall of the pipe 20 a distance which gives a good match between the shunt arm 16 and the collinear arms 10 and 12, and which at the same time establishes a wide enough gap to limit voltage breakdown and maintain adequate peak power capacity in the shunt arm 16.

By way of example, for a hybrid junction operable over a frequency band of 5400 to 5900 megacycles, the following dimensions give effective results:

| | |
|---|---|
| Internal cross section of four arms | 1⅞" x ⅞". |
| Edge **35** | .770" long. |
| Edge **37** | .675" long. |
| Spacing between edge **32** and opposite wall of pipe **20** | .448". |
| Thickness of plate **40** | .100". |
| Distance from tapered edge of blocks **22** and **24** to plane of conductive surface of plate **40** | .143". |

From the above description it will be recognized that the various objects of the invention have been achieved by providing a folded hybrid junction which functions like a conventional magic tee but which provides a much more compact structure. All the arms of the folded hybrid junction lie parallel to a single plane, so that the junction may be used in a space no wider than the width dimension necessary for a wave guide transmission line alone. The match between the branch arms and the folded collinear arms is quite good. The power handling capacity, at least between the collinear arms and the parallel series arm 14, is substantially higher than for the ordinary magic tee. Actually no attempt was made to maximize the power capacity of the shunt arm 16. This might be effected by tapering the ends of the blocks 22 and 24 where they extend into the second pipe 20.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A folded hybrid junction comprising a first hollow pipe including a square section, a rectangular wave guide section, and a tapered wave guide section joining the square and rectangular sections, the first pipe sections being aligned along a common longitudinal axis, a second hollow pipe including first and second rectangular wave guide sections aligned along a longitudinal axis, the first section of the second pipe having a smaller narrow dimension than the second section, the first section of the second pipe being joined to the first pipe in the region of the tapered section with the longitudinal axes of the first and second pipes intersecting at right angles and with the broad walls of said second pipe normal to the plane defined by the intersecting axes, and a septum lying in said axis-defined plane and extending the entire distance between opposite walls of the square section of the first pipe for dividing the first pipe into two parallel wave guides, the septum terminating in the tapered section of the first pipe in an edge extending parallel to the longitudinal axis of the second pipe, the septum having a first portion extending into the rectangular section of the first pipe and a second portion extending into the narrow section of the second pipe, said first portion extending along the wall of the first pipe opposite the junction with the second pipe a distance beyond said edge of the septum of substantially a quarter wavelength at the operating frequency of the hybrid junction and being spaced from the opposite wall a distance of substantially a half wavelength, the second portion extending along the wall of the second pipe nearest the square section of the first pipe and having an edge spaced from the opposite wall of the second pipe, the edge being an extension of said terminating edge of the septum, the second portion of the septum being tapered at the end projecting into the second pipe.

2. A folded hybrid junction comprising a first hollow pipe including a square section, a rectangular section, and a tapered section joining the square and rectangular sections, the first pipe sections being aligned along a common longitudinal axis, a second hollow pipe including first and second rectangular waveguide sections aligned along a longitudinal axis, the first section of the second pipe having a smaller narrow dimension than the second section, the first section of the second pipe being joined to the first pipe in the region of the tapered section with the longitudinal axes of the first and second pipe intersecting at right angles and with the broad walls of said second pipe normal to the plane defined by the intersecting axes, and a septum lying in said axis-defined plane and extending the entire distance between opposite walls of the square section of the first pipe for dividing the first pipe into two parallel wave guides, the septum terminating in the tapered section of the first pipe in an edge extending parallel to the longitudinal axis of the second pipe, the septum having a first portion extending into the rectangular section of the first pipe and a second portion extending into the narrow section of the second pipe, said first portion extending along the wall of the first pipe opposite the junction with the second pipe a distance beyond said edge of the septum of substantially a quarter wavelength at the operating frequency of the hybrid junction and being spaced from the opposite wall a distance of substantially a half wavelength, the second portion extending along the wall of the second pipe nearest the square section of the first pipe and having an edge spaced from the opposite wall of the second pipe, the edge being an extension of said terminating edge of the septum.

3. A folded hybird junction comprising a first hollow pipe including a square section, a rectangular section, and a tapered section joining the square and rectangular sections, the first pipe sections being aligned along a common longitudinal axis, a second hollow pipe including first and second rectangular wave guide sections aligned along a longitudinal axis, the first section of the second pipe having a smaller narrow dimension than the second section, the first section of the second pipe being joined to the first pipe in the region of the tapered section with the longitudinal axes of the first and second pipes intersecting at right angles and with the broad walls of said second pipe normal to the plane defined by the intersecting axes, and a septum lying in said axis-defined plane and extending the entire distance between opposite walls of the square section of the first pipe for dividing the first pipe into two parallel wave guides, the septum terminating in the tapered section of the first pipe in an edge extending parallel to the longitudinal axis of the second pipe, the septum having a first portion extending into the rectangular section of the first pipe and a second portion extending into the narrow section of the second pipe, said first portion extending along the wall of the first pipe opposite the junction with the second pipe a distance beyond said edge of the septum of substantially a quarter wavelength at the operating frequency of the hybrid junction and being spaced from the opposite wall a distance of substantially a half wavelength, the second portion extending along the wall of the second pipe nearest the square section of the first pipe and having an edge spaced from the opposite wall of the second pipe.

4. A folded hybrid junction comprising a first hollow pipe including a square section, a rectangular section, and a tapered section joining the square and rectangular sections, the first pipe sections being aligned along a common longitudinal axis, a second hollow pipe including first and second rectangular wave guide sections aligned along a longitudinal axis, the first section of the second pipe having a smaller narrow dimension than the second section, the first section of the second pipe being joined to the first pipe in the region of the tapered section with the longitudinal axes of the first and second pipes intersecting at right angles and with the broad walls of said second pipe normal to the plane defined by the intersecting axes, and a septum lying in said axis-defined plane and extending across the entire space between opposite walls of the square section of the first pipe for dividing the first pipe into two parallel wave guides, the septum terminating in the tapered section of the first pipe in an edge extending parallel to the longitudinal axis of the second pipe, the septum having a first portion extending into the rectangular section of the first pipe and a second portion extending into the narrow section of the second pipe, said first portion extending along the wall of the first pipe opposite the junction with the second pipe a distance beyond said edge of the septum of substantially a quarter wavelength at the operating frequency of the hybrid junction and being spaced from the opposite wall a distance of substantially a half wavelength.

5. A folded hybrid junction comprising a first hollow pipe including a square section, a rectangular section, and a tapered section joining the square and rectangular sections, the first pipe sections being aligned along a common longitudinal axis, a second hollow pipe including first and second rectangular wave guide sections aligned along a longitudinal axis, the first section of the second pipe having a smaller narrow dimension than the second section, the first section of the second pipe being joined to the first pipe in the region of the tapered section with the longitudinal axes of the first and second pipes intersecting at right angles and with the broad walls of said second pipe normal to the plane defined by the intersecting axes, and a septum lying in said axis-defined plane and extending the entire distance between opposite walls of the square section of the first pipe for dividing the first pipe into two parallel wave guides, the septum having a first portion extending into the rectangular section of the first pipe and a second portion extending into the narrow section of the second pipe, said first portion extending along the wall of the first pipe opposite the junction with the second pipe a distance of substantially a quarter wavelength at the operating frequency of the hybrid junction and being spaced from the opposite wall a distance of substantially a half wavelength.

6. A folded hybrid junction comprising a first hollow pipe including a square section, a rectangular wave guide section, and a tapered wave guide section joining the square and rectangular sections, said sections being aligned along a common longitudinal axis, a second hollow rectangular pipe joined to the first pipe in the region of the tapered wave guide section, the longitudinal axes of the first and second pipes intersecting at right angles and the broad walls of said second pipe being normal to the plane defined by the intersecting axes, and a septum lying in said axis-defined plane and extending the entire distance between opposite walls of the square section of the first pipe for dividing the first pipe into two parallel wave guides, the septum having a first portion extending into the rectangular section of the first pipe and a second portion extending into the second pipe, said first portion extending along the wall of the first pipe opposite the junction with the second pipe a distance of substantially a quarter wavelength at the operating frequency of the hybrid junction and being spaced from the opposite wall a distance of substantially a half wavelength.

7. A folded hybrid junction comprising a first hollow pipe including a square section, a rectangular wave guide section, and a tapered wave guide section joining the square and rectangular sections, said sections being aligned along a common longitudinal axis, a second hollow rectangular pipe joined to the first pipe in the region of the tapered section, the longitudinal axes of the first and second pipes intersecting at right angles and the broad walls of said second pipe being normal to the plane defined by the intersecting axes, and a septum lying in said axis-defined plane and extending the entire distance between opposite walls of the square section of the first pipe for dividing the first pipe into two parallel wave guides, the septum having a first portion extending into the rectangular section of the first pipe and a second portion extending into the second pipe, said first portion extending along the wall of the first pipe opposite the junction with the second pipe.

8. A folded hybrid junction comprising a first hollow pipe including a square section, a rectangular wave guide section, and a tapered wave guide section joining the square and rectangular sections, said sections being aligned along a common longitudinal axis, a second hollow rectangular pipe joined to the first pipe in the region of the tapered section, the longitudinal axes of the first and second pipes intersecting at right angles and the broad walls of said second pipe being normal to the plane defined by the intersecting axes, and a septum lying in said axis-defined plane and extending the entire distance between opposite walls of the square section of the first pipe for dividing the first pipe into two parallel wave guides, the septum having a first portion extending into the rectangular section of the first pipe and a second portion extending into the second pipe.

9. A folded hybrid junction comprising a first hollow pipe, a second hollow pipe including first and second rectangular wave guide sections aligned along a longitudinal axis, the first section of the second pipe having a smaller narrow dimension than the second section, the first section being joined at one end to one wall of the first pipe to form a T-junction with the longitudinal axes of the first and second pipes intersecting at right angles and with the broad walls of said second pipe normal to the plane defined by the intersecting axes, and a septum lying in said axis-defined plane and positioned in the first pipe substantially to one side of the junction with the second pipe, the septum terminating over a portion of its extent between opposite walls of the first pipe in an edge parallel to the longitudinal axis of the second pipe within the region of the junction with the second pipe, the septum including a first portion extending beyond said edge of the septum along the wall opposite said one wall to which the second pipe is joined a distance of substantially a quarter wavelength at the operating frequency of the hybrid junction and spaced from the wall to which the second pipe is joined a distance of substantially a half wavelength, the septum including a second portion extending into the second pipe.

10. A folded hybrid junction comprising a first hollow pipe having four walls, a second hollow rectangular pipe joined at one end to one wall of the first pipe to form a T-junction with the longitudinal axes of the first and second pipes intersecting at right angles and with the broad walls of said second pipe normal to the plane defined by the intersecting axes, and a septum lying in said axis-defined plane and positioned in the first pipe substantially to one side of the junction with the second pipe, the septum terminating over a portion of its extent between opposite walls of the first pipe in an edge parallel to the longitudinal axis of the second pipe within the region of the junction with the second pipe, the septum including a first portion extending beyond said edge of the septum along the wall opposite said one wall to which the second pipe is joined a distance of substantially a quarter wavelength at the operating frequency of the hybrid junction and spaced from the wall to which the second pipe is joined a distance of substantially a half wavelength, the septum including a second portion extending into the second pipe.

11. A folded hybrid junction comprising a first hollow pipe having four walls, a second hollow rectangular pipe joined at one end to one wall of the first pipe to form a T-junction with the longitudinal axes of the first and second pipes intersecting at right angles and with the broad walls of said second pipe normal to the plane defined by the intersecting axes, and a septum lying in said axis-defined plane and positioned in the first pipe substantially to one side of the junction with the second pipe, the septum terminating over a portion of its extent between opposite walls of the first pipe in an edge parallel to the longitudinal axis of the second pipe within the region of the junction with the second pipe, the septum including a first portion extending beyond said edge of the septum along the wall opposite said one wall to which the second pipe is joined, the septum including a second portion extending into the second pipe.

12. A folded hybrid junction comprising a first hollow pipe having four walls, a second hollow pipe joined at one end to one wall of the first pipe, the longitudinal axes of the first and second pipes intersecting, and a septum lying in the plane defined by the intersecting axes and being positioned in the first pipe substantially to one side of the junction with the second pipe, the septum including a first portion extending beyond the region of the junction with the second pipe along the wall opposite said one wall to which the second pipe is joined, the septum including a second portion extending into the second pipe, said second portion being so oriented that its surface is in parallel relation to the electric field vectors of the dominant mode of said second pipe.

References Cited in the file of this patent

UNITED STATES PATENTS

| | | |
|---|---|---|
| 2,445,986 | Tyrrell | July 27, 1948 |
| 2,575,804 | Friis et al. | Nov. 20, 1951 |
| 2,584,162 | Sensiper et al. | Feb. 5, 1952 |
| 2,593,120 | Dicke | Apr. 15, 1952 |
| 2,643,295 | Lippmann et al. | June 23, 1953 |